Jan. 15, 1952  J. R. K. RUSSELL ET AL  2,582,798
MANUFACTURE OF SPECTACLE FRAMES OR BLANKS
Filed Aug. 19, 1948  2 SHEETS—SHEET 1
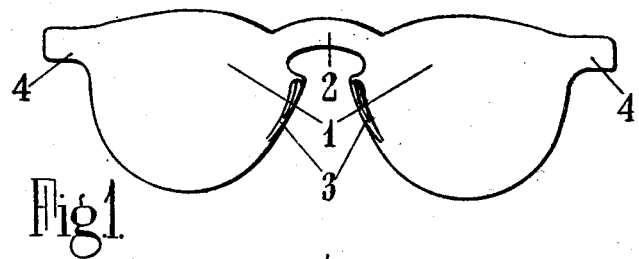
Fig.1.
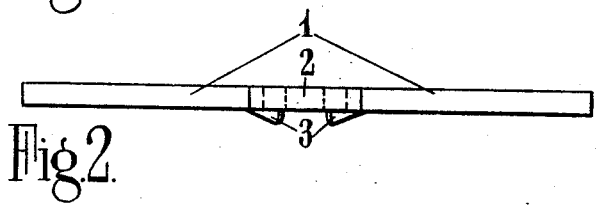
Fig.2.
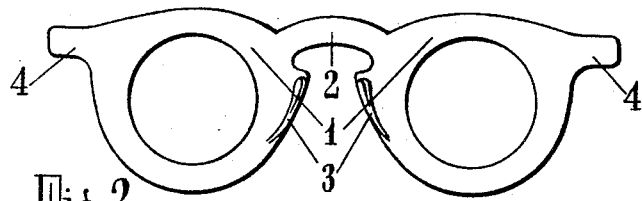
Fig.3.
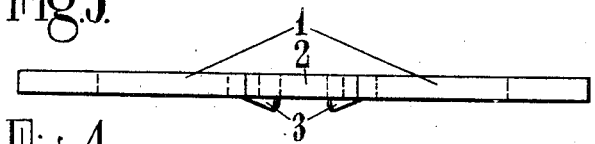
Fig.4.
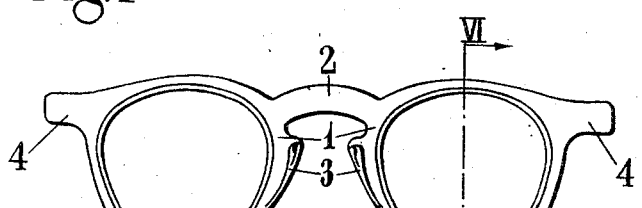
Fig.5.
Fig.6.
Inventors:
John Rowland Keeming Russell
and Alois Prasser
by Eugene L. Purdy
Attorney Jan. 15, 1952 J. R. K. RUSSELL ET AL 2,582,798
MANUFACTURE OF SPECTACLE FRAMES OR BLANKS
Filed Aug. 19, 1948 2 SHEETS—SHEET 2
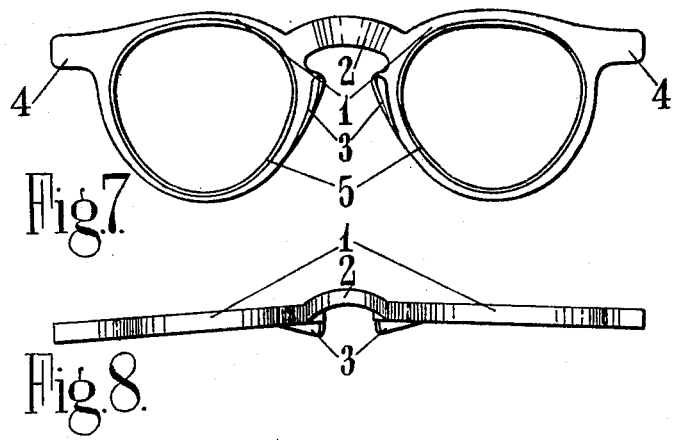
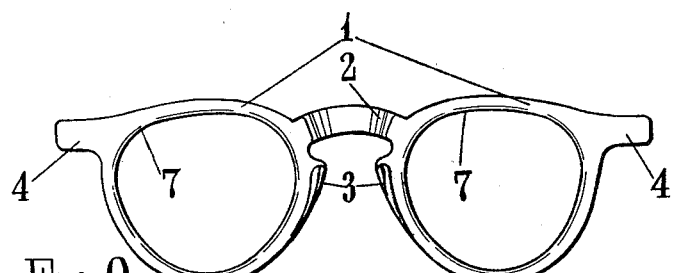
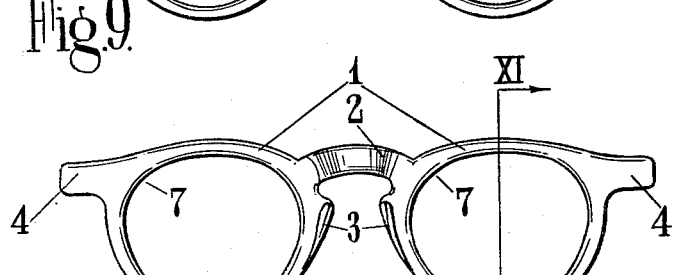
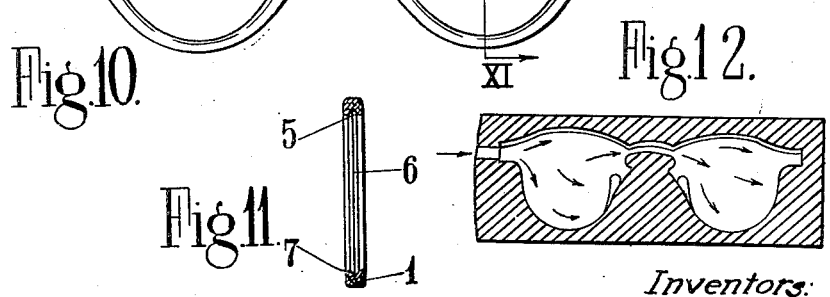
Inventors:
John Rowland Keeming Russell
and Alois Prasser
by Eugene L. Vandey
Attorney Patented Jan. 15, 1952

2,582,798

UNITED STATES PATENT OFFICE 2,582,798

MANUFACTURE OF SPECTACLE FRAMES OR BLANKS

John Rowland Keeming Russell and Alois Prasser, Treforest, Glamorgan, Wales, assignors to Spectator Optical Products Limited, Treforest, Glamorgan, Wales Application August 19, 1948, Serial No. 45,148
In Great Britain August 19, 1947

3 Claims. (Cl. 18—47.5)

This invention relates to the manufacture of spectacle frames or blanks from organic compositions capable of being moulded.

Hitherto the practice has been to cut the blanks which by subsequent finishing operations are converted into spectacle frames, from sheets of staple material, for instance cellulose nitrate or cellulose acetate compositions in sheet form, or by the injection of a suitable moulding composition, the blank being hitherto in such case actually an unfinished frame in which are left apertures generally corresponding with the lenses to be engaged in the frame.

The latter process which, as hitherto practised, has involved the injection of the material into the mould so that it forms two streams, has led to an unavoidable structural weakness at the point where the two streams of moulding compound are forced to meet in the mould.

The object of the invention is to provide a process of forming blanks adapted to be worked up into the form of spectacle frames in which this difficulty is overcome.

The invention consists in forming the blanks with a substantially correctly shaped outline or periphery but without lens apertures, and subsequently forming such apertures by a cutting operation as for instance by milling out the excess material or otherwise removing it.

More particularly the invention consists in moulding the blanks by injecting a moulding composition into the mould at a position adjacent the portion of the mould in which one of the eye pieces is formed so that the material injected flows from that portion of the mould across the portion of the mould providing the bridge to the portion of the mould in which the other eye piece is formed.

A further, though optional, feature of the invention consists in forming the eye pieces and bridge portion in one plane and subsequently subjecting the bridge portion to a bending operation under the action of heat, whereby it is curved outward from the plane of the eye pieces.

In addition to cutting out the apertures for the lenses the blank may be subjected to such other treatment as is necessary to provide a suitable finish as, for instance, by rounding the edges of the frame and cutting grooves for the engagement of the edges of the lens.

The invention will be described further in detail and by way of example with reference to the accompanying drawings, in which:

Figure 1 is a view in elevation, and

Figure 2 is a view in plan of the blank as formed by injection moulding.

Figures 3 and 4 are respectively views in elevation and plan of a frame in the first state of its formation from a blank as illustrated in the preceding figures.

Figure 5 is a view in elevation, and

Figure 6 is a view in section on a plane indicated by the line VI—VI of Figure 5 of the frame in the second stage of the treatment.

Figures 7 and 8 are respectively views in elevation and plan of the frame after it has been subjected to further treatment, Figure 9 is a view in elevation of the frame after further treatment, Figure 10 is a view in elevation;

Figure 11 is a view in section on a plane indicated by the line XI—XI of Figure 10 of the finished frame; and Figure 12 is a schematic view indicating the manner in which the plastic material is introduced into the mould cavity.

Referring to Figures 1 and 2, I are the eyepiece portions of the frame in which lenses will be engaged, 2 the bridge connecting them, 3 flange-like elements adapted to engage or rest upon the nose of the wearer and 4 are lugs for effecting hinged connection with the temples.

The whole of the blank illustrated in Figure 1 is constituted by suitable plastic material adapted for injection moulding and the injection is effected (as diagrammatically illustrated in Fig. 12 in which the direction of flow is indicated by the arrows) so that the composition is introduced into the portion of the mould in which one of the eye pieces is formed and flows across the portion of the mould which provides the bridge and into the portion of the mould in which the other eye piece is formed, a mode of procedure which appears to effect the strengthening of the portion of the frame constituting the bridge.

As is shown in Figures 3 and 4, the central portion of each eye piece is cut out to provide means for engaging lenses with the frame.

Figures 5 and 6 show how these openings are shaped for the engagement of the lenses and as shown they are not circular but of one of the customary forms now in favour. The front and rear portions of the frame in the immediate vicinity of these openings are provided with bevelled parts 5 and they are furnished with grooves 6 for the engagement of the lenses.

As shown in Figures 7 and 8 the bridge which initially is in the same plane as the eye piece portions of the blank is bent, the bending being effected subsequent to the moulding operation.

Figures 9, 10 and 11 illustrate the form of the frame when the finishing operations have been effected, that is to say the frames are furnished with rounded surfaces 7 and as will be seen clearly from Figure 11 all sharp edges of the frame have been removed.

The process according to the invention avoids the weakness of injection moulded frames as hiterto produced and additionally enables grades of cellulose acetate moulding compound to be selected which, in the finished spectacle frame, give the desired qualities of resilience, flexibility, dimensional stability and tensile strength comparable with Celluloid.

Further the process successfully avoids the objectionable cross-grain effect which, particularly in mottled materials, is well known to the manufacturer of sheet frames from either cellulose acetate or Celluloid sheet. This cross-grain effect is the inherent weakness of frames formed from sheet material and arises from the methods of production of the sheets.

In all plastic spectacle frames the bridge is normally the most vulnerable point. To secure sufficient strength at the bridge, manufacturers from sheet normally thicken up the section of the frame on the bridge.

The method according to the invention assists this strengthening as the stream of injected material introduced into the mould is constricted as it flows from the one eye piece to the second eye piece this constricting of the material at the bridge apparently giving a strengthening effect such as might with other materials be obtained by tempering. Adequate strengthening at the bridge without unduly increasing cross sections can thus be secured, and this strengthening is enhanced in consequence of the fact that as is preferred the blanks are injected with the axis of the bridge coincident with the plane axis of the eye pieces and by a heating and pressing operation the bridge is shaped to a curve as required. This bridge shaping operation is common to the methods employed in production of frames from sheet but from experience it would appear that this operation when applied to sheet material tends to weaken the bridge but when applied to the materials which can only satisfactorily be employed by the injection of the blanks a further strengthening of the bridge results.

It may further be pointed out that spectacle frames produced from sheet stock commonly show notable inconsistencies, e. g. dissymmetry and inequality of size of the two eye pieces and uneven rim thickness. As the moulds employed are consistent, all danger that there could be variation from frame to frame among frames of nominally the same dimensions is eliminated.

The use of moulds and high precision jigs enables standardisation to be secured whereas the manufacturer from sheet must rely principally on manual skill of operators in shaping, filing and pad-gluing.

We claim:

1. In the manufacture of spectacle frames from moldable plastics, the method which comprises introducing a plastic material of the synthetic resin type heated to flowable condition into a mold cavity of continuous, unitary and unobstructed area corresponding approximately in outline to that of a spectacle frame constituted of two eye-piece sections connected by a constricted bridge section, each eye-piece section of the mold cavity corresponding to the area occupied by the lens and the lens-supporting part of a pair of spectacles and flowing said plastic material under pressure in an undivided stream from one eye-piece section through the constricted bridge section to the other eye-piece section to completely fill the mold cavity, allowing said plastic material to solidify to form a spectacle blank corresponding to the shape of the mold cavity and subsequently recessing the portions of the blank corresponding to the eye-pieces to provide lens openings therein.

2. In a method as set forth in claim 1 in which the flow of the plastic material throughout the mold cavity is in substantially a common plane and subjecting the portion of the spectacle blank forming the bridge of the spectacle frame to heat and pressure so as to displace said bridge out of the common plane defined by the eye-pieces.

3. In the manufacture of blanks for spectacle frames from moldable plastics, the method which comprises introducing a plastic material of the synthetic resin type heated to flowable condition into a mold cavity of continuous, unitary and unobstructed area corresponding approximately in outline to that of a spectacle frame constituted of two eye-piece sections connected by a constricted bridge section each eye-piece section of the mold cavity corresponding to the area occupied by the lens and the lens-supporting part of a pair of spectacles, and flowing said plastic material under pressure in an undivided stream from one eye-piece section through the constricted bridge section to the other eye-piece section to completely fill the mold cavity.

JOHN ROWLAND KEEMING RUSSELL.
ALOIS PRASSER.

REFERENCES CITED

The following references are of record in the file of this patent:

UNITED STATES PATENTS

| Number | Name | Date |
|---|---|---|
| 1,510,001 | Gunning | Sept. 30, 1924 |
| 1,571,067 | Schumacher | Jan. 26, 1926 |
| 2,404,671 | Vinal | July 23, 1946 |

FOREIGN PATENTS

| Number | Country | Date |
|---|---|---|
| 439,264 | Great Britain | Dec. 3, 1935 |

OTHER REFERENCES

Tool and Die Journal, November 1942, pages 118 to 121, by Don F. Hoffman.